(12) United States Patent
Pratt et al.

(10) Patent No.: US 7,752,108 B2
(45) Date of Patent: Jul. 6, 2010

(54) APPARATUS, SYSTEM, AND METHOD FOR AN ASSET-BACKED PURCHASE CARD

(75) Inventors: Jason W. Pratt, Austin, TX (US); Bernard von NotHaus, Evansville, IN (US)

(73) Assignee: Liberty Payment Systems, LLC, Las Vegas, NV (US)

( * ) Notice: Subject to any disclaimer, the term of this patent is extended or adjusted under 35 U.S.C. 154(b) by 0 days.

(21) Appl. No.: 11/774,413

(22) Filed: Jul. 6, 2007

(65) Prior Publication Data

US 2008/0010201 A1 Jan. 10, 2008

Related U.S. Application Data

(60) Provisional application No. 60/819,059, filed on Jul. 7, 2006.

(51) Int. Cl.
*G06F 17/60* (2006.01)
(52) U.S. Cl. ..................................................... 705/35
(58) Field of Classification Search ....................... None
See application file for complete search history.

(56) References Cited

U.S. PATENT DOCUMENTS

| | | | | |
|---|---|---|---|---|
| 4,774,663 A | * | 9/1988 | Musmanno et al. | 705/36 R |
| 5,025,138 A | | 6/1991 | Cuervo | |
| 5,206,803 A | | 4/1993 | Vitagliano et al. | |
| 5,461,708 A | * | 10/1995 | Kahn | 345/440 |
| 5,590,325 A | * | 12/1996 | Kolton et al. | 707/3 |
| 5,724,523 A | | 3/1998 | Longfield | |
| 5,745,706 A | * | 4/1998 | Wolfberg et al. | 705/35 |
| 5,787,404 A | | 7/1998 | Fernandez-Holmann | |
| 5,812,987 A | * | 9/1998 | Luskin et al. | 705/36 R |
| 5,950,179 A | | 9/1999 | Buchanan et al. | |
| 6,460,021 B1 | | 10/2002 | Kirksey | |
| 6,659,259 B2 | | 12/2003 | Knox et al. | |
| 2002/0194118 A1 | | 12/2002 | Nassar | |
| 2003/0069838 A1 | | 4/2003 | Harland | |
| 2004/0064392 A1 | | 4/2004 | Barkman, Jr. | |

(Continued)

OTHER PUBLICATIONS

Encyclopedia of Banking and Finance: Tenth edition by Charles J. Woelfel ; A Bankline Pulbication: Probus Publishing Col, Chicago, Illinois; Cambridge, England: 1994.*

(Continued)

*Primary Examiner*—James P Trammell
*Assistant Examiner*—Mary Gregg
(74) *Attorney, Agent, or Firm*—Kunzler Needham Massey & Thorpe (57) ABSTRACT

An apparatus, system, and method are disclosed for an asset backed purchase card. The present invention includes a house account comprising one or more assets, each of the one or more assets having a substantially continually updated spot purchase price. The invention receives funds from a consumer in exchange for a portion of the one or more assets from the house account based on an internal spot price of the asset, increasing a balance in a purchase account of the consumer. The purchase account is debited by selling a quantity of the asset backing the purchase account balance to the house account based on the internal spot price of the asset in response to a transaction based on a purchase card purchase by the consumer.

20 Claims, 6 Drawing Sheets

U.S. PATENT DOCUMENTS

2004/0243498 A1    12/2004  Duke
2005/0033678 A1*   2/2005   Huneault ..................... 705/36
2005/0187855 A1*   8/2005   Brennan et al. ............... 705/37
2006/0095355 A1    5/2006   Mayers et al.
2006/0106707 A1*   5/2006   Shetty et al. ................. 705/37

OTHER PUBLICATIONS

"Gold Dinar Transaction Can be Carried Out via Debit Cards" Malaysia Econimic News, Apr. 29, 2002.* http://web.archive.org/web/*/http://222.3-dinar.com- Aug. 26, 2004 - 17 pgs.*

* cited by examiner

APPARATUS, SYSTEM, AND METHOD FOR AN ASSET-BACKED PURCHASE CARD

CROSS-REFERENCES TO RELATED APPLICATIONS

This application claims the benefit of U.S. Provisional Patent Application No. 60/819,059 entitled "APPARATUS, SYSTEM, AND METHOD FOR AN ASSET-BACKED CREDIT/DEBIT CARD" and filed on Jul. 7, 2006 for Bernard von NotHaus, et al., which is incorporated herein by reference.

BACKGROUND OF THE INVENTION

1. Field of the Invention

This invention relates to credit/debit transactions and more particularly relates to asset backed purchase cards.

2. Description of the Related Art

A common way to purchase goods and services in the modern economy is the credit card. A credit card allows a credit provider to effectively lend the user money to cover the cost of a purchase. When a purchase is made, the credit card issuer pays the purchase price to the seller, often withholding a fee for the service. In addition, the credit card user agrees to pay the card issuer the price of the purchase. At regular intervals, the card user is issued a bill from the credit card issuer for payment of money to cover the cost of purchases and any associated fees. Charge cards operate under similar principles, but require the charge card user to pay the entire balance at a regular interval.

Credit card users often face difficulties in paying the bills associated with their credit cards. Interest charges can be high, as can other fees associated with the use of the card. One justification for these high costs is the risk taken on by the credit card issuer associated with the loan in relation to inflation. The relative value of the loan may decrease under inflationary pressures, therefore, the lender must make a substantial return to hedge that risk.

A similar purchase system is the debit card, which requires the card user to maintain an account funded with money. A debit card allows a debit provider to pay the seller the price of the transaction and debit the price against the funds in the card user's account. Debit cards shift the risk associated with devaluation of the currency funding the account to the debit card user, who must maintain a balance of money in order to use the debit card. Inflation reduces the purchasing power of the money in the account, and a debit card user may find that the value of the money tied up in the debit card account is dramatically lower than it was when deposited.

In the U.S., credit, debit, and charge cards use the U.S. dollar to pay for purchases, calculate finance charges, and determine the amount owed. Card users in other countries typically use their local currency to track the amounts in debit or credit accounts. Regardless of the local currency used, inflation poses a risk to the users of the cards, either as increased costs and fees or as a direct risk to a deposit account backing a debit card.

SUMMARY OF THE INVENTION

From the foregoing discussion, it should be apparent that a need exists for an apparatus, system, and method for a purchase card that protects the credit user from the risk of inflation. Beneficially, such an apparatus, system, and method would allow the user to conveniently purchase goods and services without paying the costs associated with the risk of currency inflation or carrying that risk.

The present invention has been developed in response to the present state of the art, and in particular, in response to the problems and needs in the art that have not yet been fully solved by currently available credit and debit cards. Accordingly, the present invention has been developed to provide an apparatus, system, and method for an asset-backed purchase card that overcome many or all of the above-discussed shortcomings in the art.

The apparatus to process a transaction for an asset-backed purchase card is provided with a plurality of modules configured to functionally execute the necessary steps of processing a transaction for an asset-backed purchase card. These modules in the described embodiments include a house account module, an asset exchange module, and a debit module. The house account module, in one embodiment, maintains a house account, the house account comprising one or more assets, each of the one or more assets having a substantially continually updated spot purchase price.

In certain embodiments, the asset exchange module receives funds from a consumer in exchange for a portion of the one or more assets from the house account. A quantity of the asset exchanged for the funds is based on an internal spot price of the asset at the time the funds are received. The quantity of the asset purchased by the consumer increases a balance in a purchase account of the consumer.

The debit module, in one embodiment, debits the purchase account of the consumer by selling a quantity of the asset backing the purchase account balance to the house account. The quantity of the asset sold to the house account is based on the internal spot price of the asset at the time of the transaction and on an amount of a transaction between the consumer and a merchant. The transaction is based on a purchase card purchase by the consumer wherein the purchase card is backed by the balance in the purchase account.

The one or more assets, in one embodiment, may be gold, silver, platinum, palladium, a real estate trust account, stocks, bonds, a market index fund, and/or a mutual fund. In one embodiment, the apparatus includes a price setting module that determines the internal spot price for transactions between the house account and a consumer. In yet another embodiment, the apparatus includes a merchant request module that receives a request for funds from a merchant based on the transaction between the merchant and consumer and pays the merchant currency based on the amount of the transaction.

The apparatus, in one embodiment, includes a transaction fee module that retains a portion of the amount of the transaction, wherein the portion retained represents a portion of a transaction fee. In one embodiment, the one or more assets exchanged for funds to increase the balance of the consumer's purchase account is based on the internal spot price of the one or more assets increased by a purchase fee. The house account module, in another embodiment, increases a quantity of the one or more assets in the house account in response to the quantity of the one or more assets in the house account dropping below a trigger level.

The apparatus is further configured, in one embodiment, to include an asset mix module that maintains the relative proportion of two or more assets in the purchase account. In another embodiment, the relative proportion of the two or more assets is determined by the consumer. In a further embodiment, the relative proportion of the two or more assets is determined by a manager.

A computer program product comprising a computer readable medium having computer usable program code executable to perform operations for processing a transaction for an asset-backed purchase card, is also presented. The operations of the computer program product, in one embodiment, include maintaining a house account, determining an internal spot price for transactions between the house account and a consumer, receiving funds from the consumer, and debiting a purchase account.

In one embodiment, maintaining a house account includes maintaining a house account that includes one or more assets, each of the one or more assets having a substantially continually updated spot purchase price. In another embodiment, receiving funds from the consumer includes receiving funds from the consumer in exchange for a portion of the one or more assets from the house account. A quantity of the asset exchanged for the funds may be based on the internal spot price of the asset at the time the funds are received. The quantity of the asset purchased by the consumer may increase a balance in a purchase account of the consumer.

Debiting a purchase account of the consumer, in one embodiment, includes selling a quantity of the asset backing the purchase account balance to the house account. The quantity of the asset sold to the house account may be based on the internal spot price of the asset at the time of the transaction and on an amount of a transaction between the consumer and a merchant. The transaction may be based on a purchase card purchase by the consumer wherein the purchase card is backed by the balance in the purchase account.

The one or more assets may include gold, silver, platinum, palladium, a real estate trust account, stocks, bonds, a market index fund, and/or a mutual fund. Determining an internal spot price of an asset, in one embodiment, may include averaging at least two spot prices of an asset, wherein the spot prices are substantially continually available. Determining the internal spot price of an asset may further include setting an internal spot price for a fixed time period, wherein a consumer may purchase or sell a quantity of the asset at the internal spot price during the fixed time period and the internal spot price comprises the average of the at least two spot prices.

The computer program product, in one embodiment, may also include determining a volatility index of the internal spot price by analyzing a trend based on the internal spot price and at least one previous internal spot price. The computer program product may also include operations for adjusting the fixed time period based on the volatility index of the internal spot price. In another embodiment, determining the volatility index comprises determining a percent change in the internal spot price with respect to at least one previous internal spot price. In a further embodiment, determining the volatility index comprises determining a slope of a line derived from the internal spot price and at least one previous internal spot price. Determining a slope, in one embodiment, may include using a curve-fitting function.

A system of the present invention is also presented for supporting an asset-backed purchase card. The system may be embodied by a purchase card that associates a consumer with a purchase account, a network that communicates data between elements of the system, a client transaction server, and a server. In particular, the system, in one embodiment, includes a client transaction server that requests payment of funds over the network, the request in response to a transaction by the consumer using the purchase card.

In another embodiment, the server includes a house account module that maintains a house account. The house account may include one or more assets, each of the one or more assets having a substantially continually updated spot purchase price. The one or more assets, in one embodiment, include gold, silver, platinum, palladium, a real estate trust account, stocks, bonds, a market index fund, and/or a mutual fund.

The server, in one embodiment, includes an asset exchange module that receives funds from a consumer in exchange for a portion of the one or more assets from the house account. The quantity of the asset exchanged for the funds may be based on an internal spot price of the asset at the time the funds are received. In one embodiment, the quantity of the asset purchased by the consumer increases a balance in a purchase account of the consumer.

In a further embodiment, the server includes a merchant request module that receives the request for payment from the client transaction server over the network. In yet another embodiment, the server includes a debit module that debits the purchase account of the consumer by selling a quantity of the asset backing the purchase account balance to the house account. The quantity of the asset sold to the house account may be based on the internal spot price of the asset at the time of the transaction and on an amount of the transaction between the consumer and a merchant.

The system may further include a point of sale computer that communicates a transaction for service or merchandise over the network. The transaction, in one embodiment, is conducted using the purchase card. In a further embodiment, the server verifies adequate assets in the purchase account of the consumer to cover a transaction in response to a request by the client transaction server.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, a digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
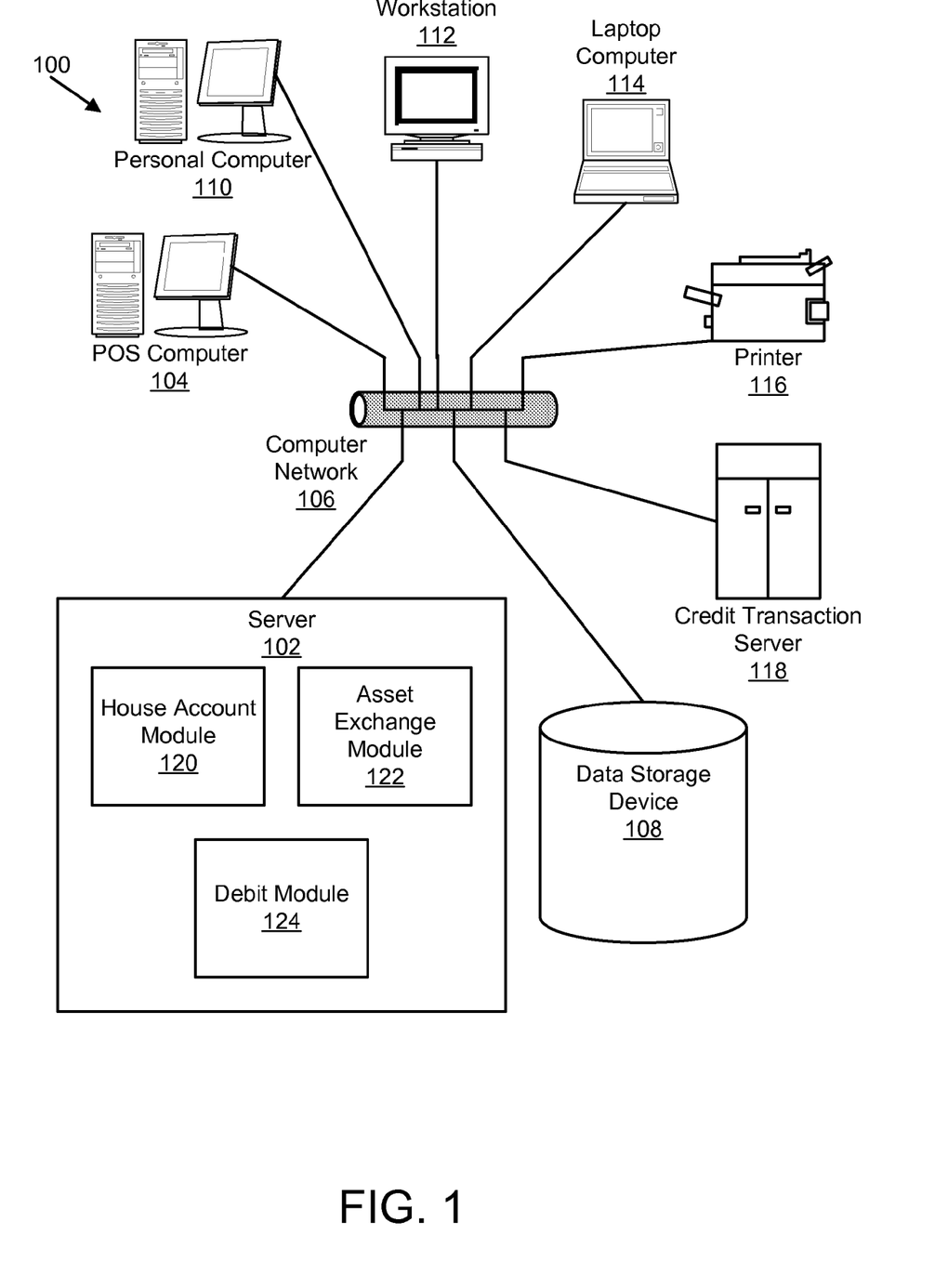
FIG. 1 is a schematic block diagram illustrating one embodiment of a system for backing card-initiated electronic transactions with a continually indexed asset in accordance with the present invention.

FIG. 1 depicts a system 100 for backing card-initiated electronic transactions with a continually indexed asset. The system 100 includes a server 102 in communication with a point-of-sale ("POS") computer 104 through a computer network 106. The server 102 may also be in communication with a data storage device 108. The system 100 may also include a personal computer 110, a workstation 112, a laptop computer 114, a printer 116, and other devices in communication with the server 102 through the computer network 106. The system 100 also includes a credit transaction server 118 in communication with the POS computer 104 and the server 102.

The server 102 may be a personal computer, workstation, mainframe computer, or the like. The computer network 106 may comprise the Internet, a local area network, a wide area network, a storage area network, a wireless network, or the like. The computer network 106 may include a combination of the networks. The computer network 106 may include hubs, switches, routers, copper cabling, fiber-optic cabling, wireless devices, servers, and the like. One of skill in the art will recognize other elements of a computer network 106 for backing card-initiated electronic transactions with a continually indexed asset.

The POS computer 104 may include a cash register, a personal computer, a terminal, a bar code scanner, a card reader, a keypad, a signature capture device, and the like. The POS computer 104 is typically located at a merchant and may comprise a check stand with an array of POS equipment or may be a POS system. The POS computer 104 is typically capable of recording a transaction for merchandise or a service provided by a merchant and communicating the transaction through the computer network 106 to the credit transaction server 118 for credit approval and other transaction related communications. One of skill in the art will recognize other POS computers 104, networks, equipment, etc.

The data storage device 108 may be in communication with the server 102 and may store transaction information, asset information, consumer profile information, and the like. The credit transaction server 118 may also be in communication with a data storage device 108 for similar purposes. The data storage device 108 may include hard disk drives, tape drives, optical drives, and the like. The data storage device 108 may be configured with a mirrored storage device, may include a redundant array of inexpensive disks ("RAID"), and may be part of a storage area network. One of skill in the art will recognize other data storage devices 108 and systems capable of storing transactions and other information related to backing card-initiated electronic transactions with a continually indexed asset.

Typically, a consumer purchases a product or service from a merchant and the consumer or merchant swipes a purchase card of the consumer at a device connected to or part of the POS computer 104. The POS computer 104 may also be an automatic teller machine ("ATM".) A merchant may also enter the purchase card number through a keypad or keyboard of the POS computer 104. A personal identification number ("PIN") may be included with debit card information. The POS computer 104 typically transmits the information to a credit transaction server 118 for authorization. The credit transaction server 118 then returns authorization to the POS computer 104 and the sale is completed. The POS computer 104 may print a receipt. The POS computer 104 may also transmit transaction information to the credit transaction server 118 for storage to a data storage device 108 or transmission to a third party, such as a bank, credit union, or financial institution that owns the purchase card of the consumer (hereinafter "financial institution").

The client transaction server is 118 typically owned and operated by a credit card processor that acts as a go-between for merchants and financial institutions. The credit card processor typically transmits transaction information through the credit transaction server 118 to the financial institution for payment. The financial institution transfers funds to the processor and the processor pays the merchant. The financial institution also typically debits an account of the consumer that made the purchase. In one embodiment, the processor typically deducts 3 or 4% of the transactions amount as a transaction fee and pays the merchant the remainder. In another embodiment, the processor pays the merchant the full transaction amount and bills the merchant for the transaction fee. The processor may also allow the financial institution to keep a portion of the transaction fee.

The server 102 of the present embodiment takes the place of the financial institution in that the credit transaction server 118 transmits merchant payment requests to the server 102 for payment. For typical credit cards, a transaction is approved or rejected based on credit worthiness of the consumer. For example, a consumer typically receives approval for a credit transaction where the difference between the consumer's account balance and the consumer's credit limit is greater than or equal to the purchase price of an item purchased with the consumer's credit card. For a debit transaction, a transaction is typically approved where the consumer's account balance is greater than the purchase price of the item being purchased. For both credit and debit card transactions, the basis of the transaction is the currency of the country where the account exists. The cost of items purchased offshore may be converted to the currency of the country where the account exists or another currency based on some currency exchange rate. In another embodiment, the basis of transactions is the currency of the country where the account exists. Alternatively, the basis of transactions is the currency of the country where the consumer resides.

A problem with currency-based transactions is that credit and debit accounts are subject to inflation of the basis currency that is not compensated for by a corresponding investment return paid to the accountholder; resulting in a loss of purchasing power for the accountholder. Once an item is purchased on a credit card, the consumer must pay a substantial interest rate because the credit card company must both make a profit and also hedge itself against inflation. For a debit account, the bank where the account exists only pays the accountholder a trivial amount of interest, if any interest is paid at all. In this case, the accountholder has tied up some amount of his/her capital in a non-interest-bearing checking account solely for the purpose of convenient spending (i.e., the consumer would prefer to keep the money in an account offering a higher return, such as a brokerage account, but does not, because it is inconvenient to spend money unless it is held in cash in a bank checking account due to high transaction costs, market closings, etc.).

The present invention overcomes many of the problems associated with currency-based credit and debit cards by offering a credit or debit card which can be used at the POS computer just like a regular credit or debit card, but is backed by a non-currency based asset, for example gold or silver. Gold, silver, or other precious metals serve as a hedge against inflation because they are traded on a world-wide market in units of ounces instead of currency units. Gold, silver, and other precious metals may appreciate in value over time at a rate higher than inflation. Some people invest money in gold and silver specifically because of these characteristics, but lose the ability to spend that money conveniently when they do so. Other assets may also back a credit or debit card such as real estate, stocks, bonds, and the like. Almost all non-cash investment assets offer higher potential returns than bank checking accounts, but suffer from a lack of liquidity for instantaneous use in purchases, transfers, etc. The present invention brings the liquidity of non-cash investment assets to par with cash, while maintaining the unique investment profiles of those assets.

The server 102 may include, in one embodiment, a house account module 120, an asset exchange module 122, and a debit module 124, all of which will be explained in detail below. The house account module 120 is configured to fund a house account by purchasing an asset in a sufficient quantity to cover consumer purchases of the asset. The asset has a substantially continually updated spot purchase price. The house account module 120 purchases the asset at the spot purchase price. The asset purchased through the house account module 120 is typically gold or silver, but may also be platinum or palladium. In one embodiment, the asset includes shares of a real estate investment trust ("REIT"). In another embodiment, the asset comprises stocks, bonds, or a combination of both. The stocks and bonds may be a mix of funds comprising an index fund that follows an index, such as the Standard and Poor 500 or the Dow Jones Industrial Average. The stocks and bonds may also be in any mutual fund of the type offered for sale by many investment firms.

It is through the use of the house account module 120 that the liquidity offered by the present invention is made possible. Without a house account module 120, each buy or sell of the backing asset would require a transaction on the open (public) market, which would be prohibitively expensive for the cardholder. By pooling all cardholders' assets into a house account, and transacting within the house account to the maximum extent possible, it is practical and possible to offer an asset-backed spending account that does not suffer from the high cost and low liquidity of a traditional investment account.

In a preferred embodiment, the asset has a spot price that is continuously available or nearly continuously available. For example, a spot price for gold or silver is typically continuously available because gold is traded world wide and usually a market somewhere in the world is always open. In another embodiment, a current spot price is variable in a particular market during trading hours and remains fixed at a market closing price. In yet another embodiment, a current spot price is variable for most of the time but may be fixed for short periods of time, such as after one market closes and before another opens. One of skill in the art will recognize other ways that an asset may have a substantially continuously updated current spot price.

Typically, the house account module 120 purchases a quantity of the asset when an amount of uncommitted assets in the house account falls below a specified trigger level. The house account module 120 may also sell a portion of the asset where the amount of uncommitted assets increases above a specified trigger level. The house account module 120 may purchase or sell quantities of the asset automatically or in response to input from an account manager. The house account module 120 may also send an alert when the quantity of uncommitted assets increases or decreases beyond an alert limit.

The server 102 may also include an asset exchange module 122 that receives funds from the consumer in exchange for a portion of the asset from the house account. The quantity of the asset exchanged for the funds is based on an internal spot price of the asset at the time the funds are received. Determination of the internal spot price is discussed below. In one embodiment, the internal spot price used to exchange the asset for the consumer's funds is increased by a purchase fee.

A purchase account is typically configured to allow a particular consumer to make purchases where the purchase price is debited to the account. The purchase account may include a unique account number, a user name, a PIN, etc. The purchase account may be an account accessible by the consumer through a financial institution, through the Internet, etc. The purchase account is typically associated with consumer information, such as the consumer's name, address, phone numbers, email addresses, and the like, with the purchase account. One of skill in the art will recognize other attributes of a purchase account of a consumer.

In one example, the internal spot price may be increased by a percentage. In one embodiment, the internal spot price is increased by 2%. In another embodiment, the internal spot price for consumer purchases of the asset is increased by a fixed amount. For example, the fixed amount may be set in a table where the fee varies such that there is a different fee for different ranges of purchase amounts. In another embodiment, the purchase fee is a combination of a fixed amount and a percentage. One of skill in the art will recognize other ways to increase a internal spot price with a purchase fee.

Once the asset exchange module 122 exchanges a quantity of the asset for the funds provided by the consumer, the asset exchange module 122 applies the asset to a purchase account of the consumer. For example, if the consumer provides $10,000 to purchase a quantity of the asset and the asset is gold, the internal spot price for gold is determined at the time the consumer tenders $10,000. If the internal spot price is determined to be $580/ounce (ounce may be abbreviated "oz") for gold and the purchase fee is 2% of the internal spot price, the internal spot price will be $580+($580×0.02)=$591.60. The exchange will be $10,000/$591.60/oz=16.903313 oz. The asset exchange module 122 in this example places a value of 16.9 oz of gold in the consumer's purchase account.

The server 102 includes, in one embodiment, a debit module 124 that debits the purchase account of the consumer by selling a quantity of the asset backing the purchase account balance to the house account. The quantity of the asset sold to the house account is based on the internal spot price of the asset at the time of the transaction and on an amount of a transaction between the consumer and a merchant. The transaction is typically based on a purchase card purchase by the consumer wherein the purchase card is backed by the balance in the purchase account. The purchase card may be a credit card, a debit card, a charge card, or an ATM card.

Typically, the asset is sold to the house account at an internal spot price at the time of the transaction. The consumer typically initiates the transaction by purchasing a product or service from a merchant using a purchase card that is backed by the consumer's purchase account. In another embodiment, the consumer initiates the transaction by requesting cash, such as at an Automated Teller Machine (ATM) machine. The card may be a credit card, debit card, or both. The card may also be an ATM card or a charge card. The card is typically part of a card network such as the Visa® or MasterCard® network or a similar network such as the Discover Card or American Express® card network. The POS computer 104 of the merchant typically gathers all pertinent information and validates the transaction through a processor via the credit transaction server 118. The credit transaction server 118 communicates the transaction amount and other details, such as consumer identification information, to the debit module 124 of the server 102. The debit module 124 debits the consumer's purchase account based on the amount of the transaction and an internal spot price of the asset backing the consumer's purchase account.

Prior to validating the transaction, typically the processor verifies that the consumer has adequate assets in the consumer's purchase account to cover the transaction amount. In an alternate embodiment, the merchant deals directly with the server 102 to verify the consumer's account can cover the transaction amount. In one embodiment, a processor is not involved and the server 102 performs the tasks typically done by the processor and credit transaction server 118.

In one example, if the consumer purchases a product from a merchant for $20 and the consumer's purchase account has an adequate balance to cover the purchase, the debit module 124 determines a quantity of the asset to be deducted from the consumer's purchase account. If the asset is gold and the internal spot price for gold was $600/oz at the time of the transaction, the debit module determines how many ounces of gold to deduct from the purchase account: $20/$600/oz.=0.033333 oz. If the purchase account balance is 16.093313 oz then the balance becomes 16.0903313−0.033333=16.869980 oz. The house account is increased by 0.03333 oz of gold.

The debit module 124, in one embodiment, may also assess a transaction fee for the transaction similar to the purchase fee described above in association with the asset exchange module 122. In one embodiment, the transaction fee may be a percentage of the purchase price. In another embodiment, the transaction fee may be a fixed fee. In yet another embodiment, the transaction fee may be a fixed fee plus a percentage. In a further embodiment, the transaction fee may comprise a tiered fee based on the purchase price.

The transaction fee may be assessed to the consumer in one embodiment. For example, in a $20 purchase with a 2% fee charged to the consumer, if the asset is gold and the internal spot price for gold was $600/oz at the time of the transaction, the debit module determines how many ounces of gold to deduct from the purchase account: $20×2%/$600/oz.=0.034 oz. If the purchase account balance is 16.093313 oz then the balance becomes 16.0903313−0.034=16.0563313 oz. The house account is increased by 0.034 oz of gold.

In another embodiment, the transaction fee may be assessed to the seller. For example, in a $20 in a $20 purchase with a 2% fee charged to the seller, if the asset is gold and the internal spot price for gold was $600/oz at the time of the transaction, the debit module determines how many ounces of gold to deduct from the purchase account: $20/$600/oz.=0.033333 oz. If the purchase account balance is 16.093313 oz then the balance becomes 16.0903313−0.033333 oz=16.869980 oz. The house account is increased by 0.033333 oz of gold. The seller is charged $20×2%=$0.40.

In one embodiment, the debit module 124 uses the internal spot price at the time of the transaction. In another embodiment, the debit module 124 uses an internal spot price at a time later than the transaction, such as the time the server 102 receives a request to debit the consumer's purchase account. One of skill in the art will recognize other times that an internal spot price can be determined in relation to a consumer's transaction.

Figure 2:
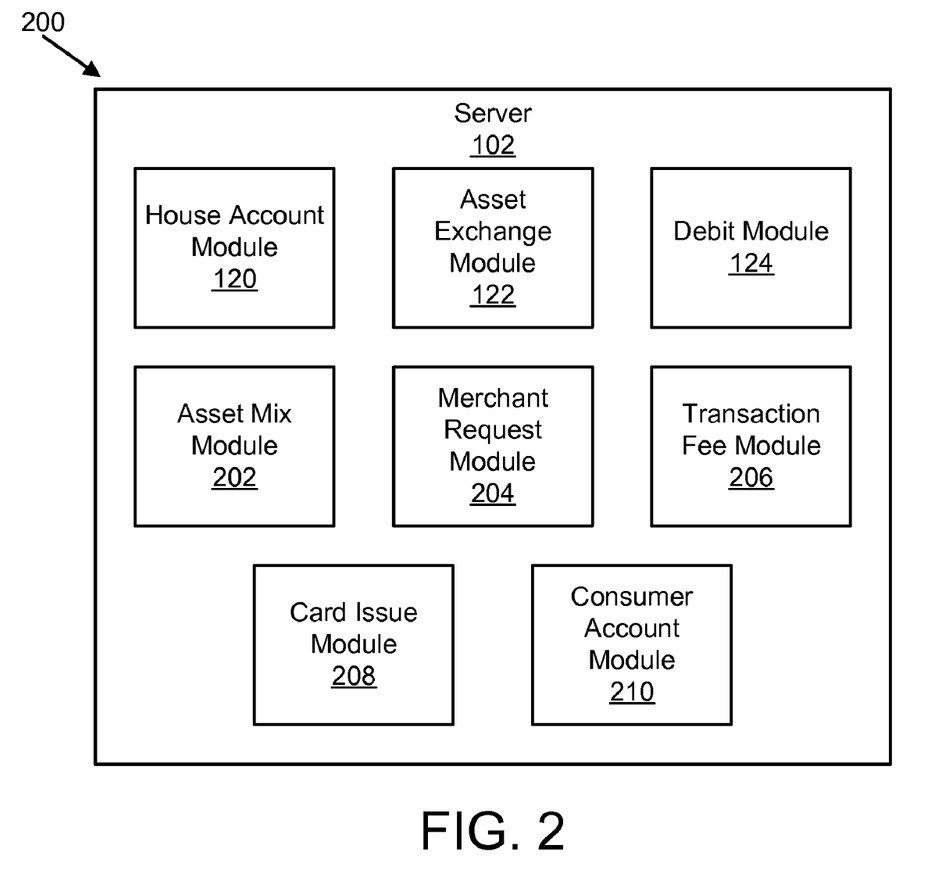
FIG. 2 is a schematic block diagram illustrating one embodiment of an apparatus for backing card-initiated electronic transactions with a continually indexed asset in accordance with the present invention.

FIG. 2 is a schematic block diagram illustrating one embodiment of an apparatus 200 for backing card-initiated electronic transactions with a continually indexed asset in accordance with the present invention. In one embodiment, the apparatus 200 includes a house account module 120, an asset exchange module 122, and a debit module 124, substantially similar to the like numbered modules described in relation to FIG. 1. In addition, the server 102 may include an asset mix module 202, a merchant request module 204, a transaction fee module 206, a card issue module 208, and a consumer account module 210, which are described below.

The server 102 may include an asset mix module 202 that creates a mix of assets in a consumer's purchase account. The mix may comprise a relative proportion of assets in the purchase account. The house account module 120, in one embodiment, acquires more than one asset for multiple house accounts. For example, one house account may be based on acquisition of gold. Another house account may be backed by silver, another by platinum, another by palladium, another by a REIT, another by stocks, etc. The asset mix module 202 may allow a consumer to designate an asset mix in the consumer's purchase account.

For example, a consumer may designate 50% gold, 25% silver, and 25% platinum. Funds provided by the consumer may be split so that 50% purchase gold for the purchase account, 25% of the funds purchase silver, and 25% of the funds purchase platinum. In one embodiment, the consumer designates an asset mix during a set-up of the purchase account and any funds added after that time are split based on the designated asset mix. In another embodiment, the consumer designates an asset mix each time the consumer provides funds for the consumer's purchase account. In another embodiment, funds are split based on an asset mix agreement, but the consumer can override the agreement each time funds are provided for the purchase account.

In one embodiment, the consumer may reallocate the asset mix of the consumer's purchase account. In another embodiment, the consumer is restricted from changing the asset mix of previously purchased assets. In another embodiment, the consumer may reallocate assets via the Internet. In another embodiment, the consumer may designate which assets are to be used for a particular merchant transaction. In another embodiment, assets are used to pay for a transaction in amounts equal to the consumer's asset mix agreement. One of skill in the art will recognize other ways the asset mix module 202 may control an asset mix of a consumer when funds are provided by the consumer, for reallocation of assets, and for transactions.

In another embodiment, the as set mix of a consumer's purchase account may be determined by a manager. For example, a consumer may agree to allow a manager to adjust the mix of the purchase account over time. The manager may determine that market conditions dictate that the mix of the purchase account should be changed. The manager may be employed by the card issuer, another party involved in the transaction, or by a third party.

In one embodiment, the server 102 includes a merchant request module 204 that receives a request for funds from a merchant based on the transaction between the merchant and consumer. The merchant request module 204 also pays the merchant currency based on the amount of the transaction. The merchant request module 204 typically receives requests for payment from the credit transaction server 118 after a consumer has made a purchase from the merchant using the consumer's card backed by the consumer's purchase account. The merchant request module 204 typically then receives a request for funds from the merchant through the credit transaction server 118. The merchant request module 204 typically pays the merchant for the amount of the transaction through the credit transaction server 118.

The server 102 in another embodiment includes a transaction fee module 206 that retains a portion of the amount of the transaction, wherein the portion retained represents a transaction fee. The amount retained is typically agreed upon with the processor. In one embodiment the transaction fee module 206 retains a portion of the transaction amount when the transaction amount is paid to the merchant involved in the transaction. In another embodiment, the transaction fee module 206 receives a portion of the transaction fee in a regular payment from the processor. One of skill in the art will recognize other ways that the transaction fee module 206 may receive a portion of the transaction fee.

Where the card used by the consumer is a debit card or a combination credit/debit card and the consumer uses a debit transaction, the transaction fee module 206 may charge a transaction fee to the consumer instead of the merchant. In another embodiment, the transaction fee module 206 does not charge a fee for a debit transaction. Determination of whether to charge a debit fee may be based on marketing decisions.

The server 102 may include a card issue module 208 that issues a card to a consumer backed by the consumer's purchase account. The card issue module 208 may issue a credit card, a debit card, or a combination of the two. The card issue module 208 may issue a card after the asset exchange module 122 receives funds from the consumer. In another embodiment, a credit card vendor, such as Visa or MasterCard, issues a card to the consumer and the card issue module 208 establishes a link between the card and the consumer's purchase account.

The server 102 may include a consumer account module 210 that establishes a purchase account for a consumer. The consumer account module 210 may receive consumer identification information, credit worthiness information, an assigned account number, or other information pertinent to establishment of the consumer's purchase account. The consumer account module 210 may link the consumer's purchase account to a network accessible by a processor or merchants. The consumer account module 210 may also activate the purchase account after receiving confirmation from the asset exchange module 122 indicating a positive balance in the purchase account.

Figure 3:
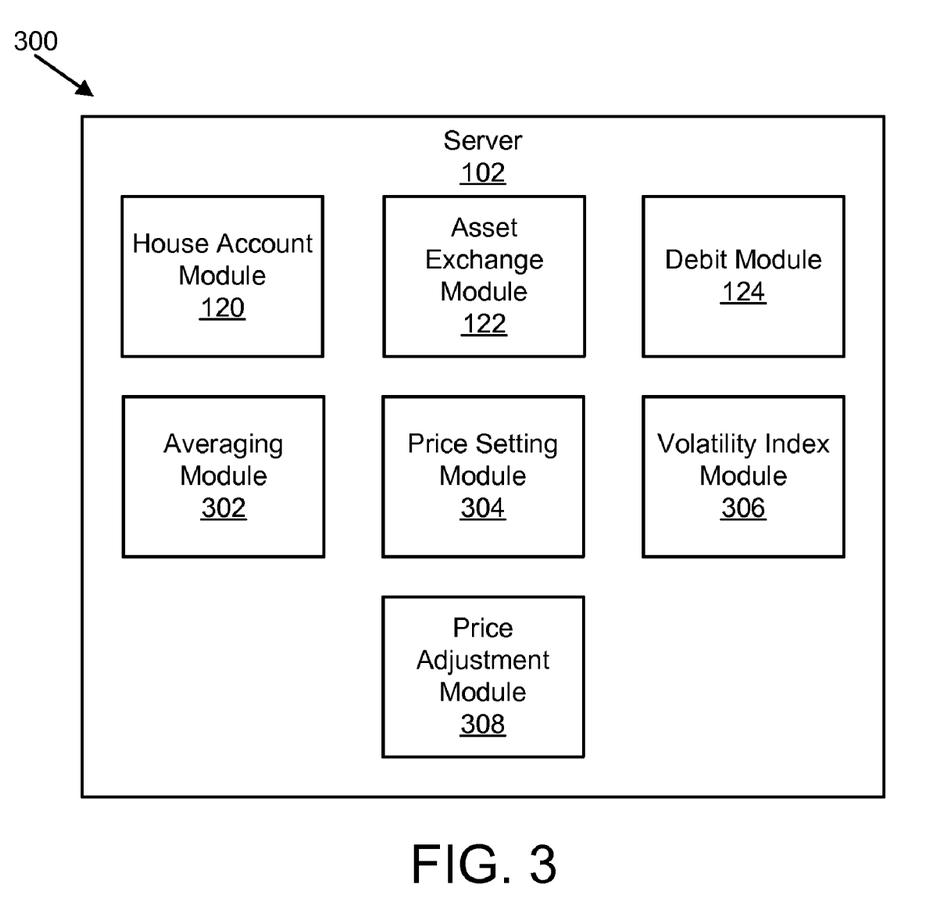
FIG. 3 is a schematic block diagram illustrating an alternate embodiment of an apparatus for backing card-initiated electronic transactions with a continually indexed asset in accordance with the present invention.

FIG. 3 is a schematic block diagram illustrating an alternate embodiment of an apparatus 300 for backing card-initiated electronic transactions with a continually indexed asset in accordance with the present invention. The apparatus 300 may include, in one embodiment, a house account module 120, an asset exchange module 122, and a debit module 124, substantially similar to the same module described in relation to FIG. 1. The apparatus 300 may also include an averaging module 302, a price setting module 304, a volatility index module 306, and a price adjustment module 308, which are described below.

The server 102, in one embodiment, includes an averaging module 302 that averages at least two spot prices of an asset. The spot prices may be set or determined by an open market, a private market, a purchaser, a seller, or another source. The spot prices are substantially continually available for the asset. Typically, the averaging module 302 averages two spot prices for an asset. For example, if one spot price for gold is $580/oz and another is $600/oz, the averaging module 302 averages the two prices to get $590/oz. In one embodiment, the averaging module 302 uses a single spot price. In another embodiment, the averaging module 302 averages three or more spot prices for an asset.

In one embodiment, the averaging module 302 verifies that the spot prices used for averaging are not in error. For example, if one price is $580/oz and another is $6/oz, the averaging module 302 may determine that the $6/oz price is too low and may select another price to average or may use the $580/oz price. The averaging module 302 may determine that the spot prices are correct by comparing the prices to a previous spot price. In another embodiment, the averaging module 302 creates a ratio of the difference between spot prices to the spot price and determines that the spot price is in error if the ratio is too high. The averaging module 302 may use any mathematical function or other algorithm to verify that one or more of the spot prices are not in error prior to averaging the spot prices.

The server 102 may also include a price setting module 304 that sets an internal spot price for a fixed time period. The price setting module 304 sets the internal spot price typically to be the average of the at least two spot prices from the averaging module 302. In another embodiment, the internal spot price may be set to a spot price determined externally, such as by a market.

A consumer may purchase or sell a quantity of the asset at the internal spot price during the fixed time period. Typically the fixed time period is set to approximately 15 minutes, but may be set longer or shorter. The fixed time period is usually set to a value that minimizes computer resources while maintaining a price that is reasonably accurate in comparison with the spot price. The minimum fixed time period may be set to the minimum time period for changing the spot prices. One of skill in the art will recognize other ways to fix a time period for the internal spot price.

The server 102 also includes a volatility index module 306 that determines a volatility index of the internal spot price by analyzing a trend based on the internal spot price and at least one previous internal spot price. The volatility index module 306, in one embodiment, uses a percentage change algorithm to determine the volatility index. In another embodiment, the volatility index module 306 uses a curve fitting algorithm to determine the volatility index. For example, if the volatility index module 306 determines that the percent change from a present value of the internal spot price to a previous value of the internal spot price is above a limit, the volatility index module 306 sets a particular value for the volatility index. For example, if the volatility index module 306 determines that the present value of the internal spot price is 2%, the volatility index module 306 may set the volatility index to a value of 2.

In another embodiment, the volatility index module 306 uses the slope of a curve determined by a curve fitting algorithm to determine the volatility index. For example, the volatility index module 306 may use one or more past values of the internal spot price to determine a slope. If the slope is 2, the volatility index may be set to 2. Typically, the greater percent change in the internal spot price or the greater the slope, the greater the volatility index. If an inverse relationship is used for the volatility index, the greater percent change in the internal spot price or the greater the slope, the lesser the volatility index.

In one embodiment, the volatility index module 306 samples spot prices for an asset at a time period less than the fixed time period used by the internal spot price. The volatility index module 306 may establish a curve through a curve fitting algorithm and find the slope of the curve by taking a derivative of the curve or some other more simple means. One of skill in the art will recognize other ways that the volatility index module 306 may determine a volatility index based on changes in an internal spot price.

The server 102 may include a price adjustment module 308 that adjusts the fixed time period based on the volatility index of the internal spot price. For example, if the volatility index is 2 based on a slope or percentage increase of the internal spot price, the price adjustment module 308 may decrease the fixed time period associated with the internal spot price. For example, if the fixed time period is 15 minutes and the volatility index is 2, the price adjustment module 308 may adjust the fixed time period to 15/2=7.5 minutes. If a reciprocal relationship is used for the volatility index and the volatility index is 0.5, the price adjustment module 308 may adjust the fixed time period to 15×0.5=7.5 minutes. The price adjustment module 308 may use a lookup table, a mathematical function, or the like to adjust the fixed time period based on the volatility index. One of skill in the art will recognize other ways that the price adjustment module 308 may adjust the fixed time period based on the volatility index.

In another embodiment, the price adjustment module 308 adjusts the internal spot price based on the volatility index. For example, the price adjustment module 308 may increase the internal spot price by 10% when the volatility index indicates that the internal spot price is rising. In another example, the price adjustment module 308 may decrease the internal spot price by 20% for a decrease in the volatility index. In yet another embodiment, the price adjustment module 308 adjusts both the fixed time period and the internal spot price.

In an alternate embodiment, the server 102 uses past and present available spot prices to determine a volatility index, adjusts the spot prices and then the averaging module 302 averages the adjusted spot prices. In sum, the server 102 may use any method to determine an internal spot price that is available to consumers for purchases/sales of the asset that reflects a reasonably accurate spot price for the asset.

Figure 4:
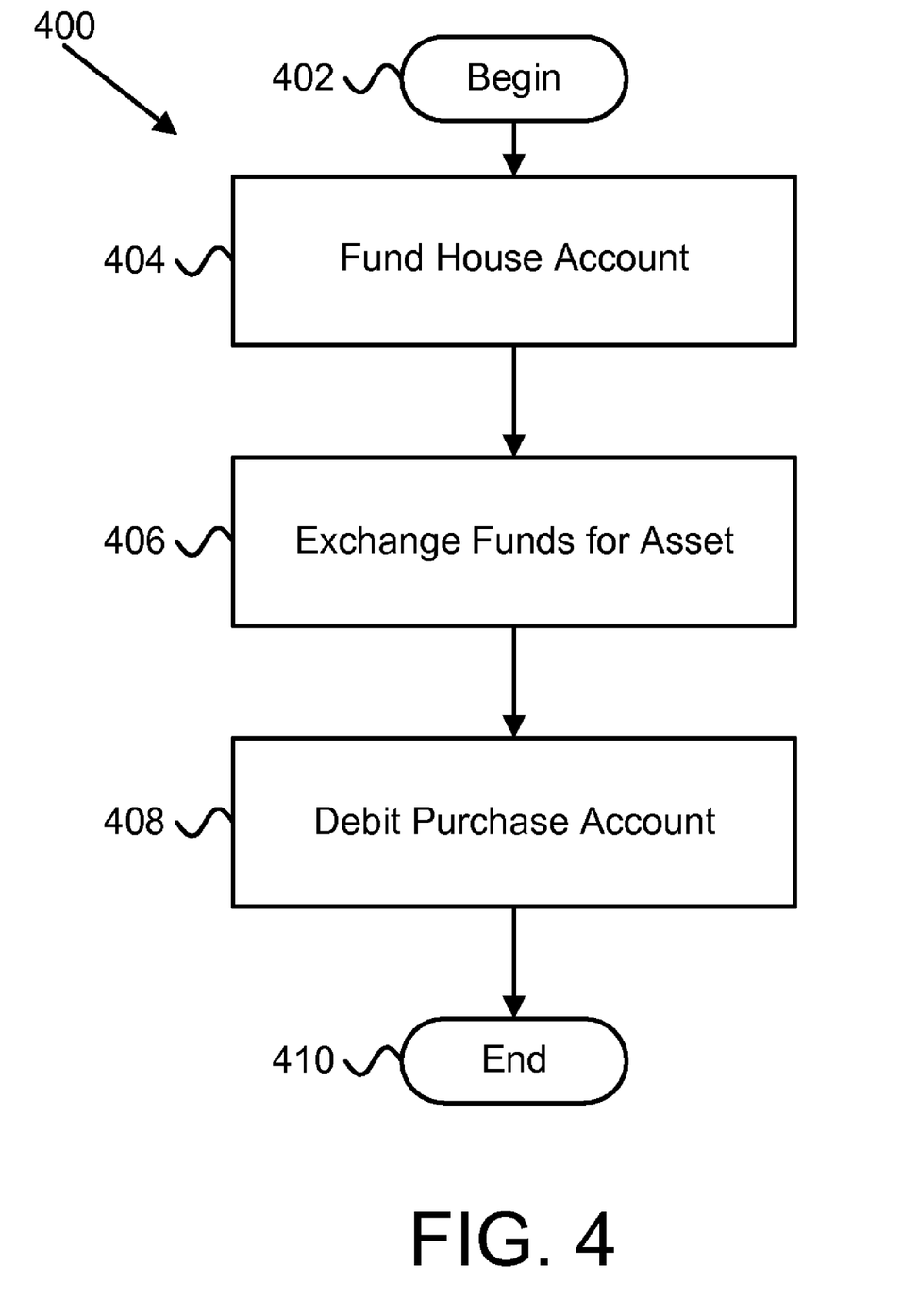
FIG. 4 is a schematic flow chart diagram illustrating one embodiment of a method for backing card-initiated electronic transactions with a continually indexed asset in accordance with the present invention.

FIG. 4 is a schematic flow chart diagram illustrating one embodiment of a method 400 for backing card-initiated electronic transactions with a continually indexed asset in accordance with the present invention. The method 400 begins 402 and the house account module 120 funds 404 a house account by purchasing an asset in a sufficient quantity to cover consumer purchases of the asset. The asset may be gold, silver, platinum, a REIT, or the like. The asset has a substantially continually updated spot purchase price and the asset is purchased at the spot purchase price.

The asset exchange module 122 receives 406 funds from the consumer in exchange for a portion of the asset from the house account. The quantity of the asset exchanged for the funds is based on an internal spot price of the asset at the time the funds are received. The value of the asset purchased by the consumer increases a balance in a purchase account of the consumer. The consumer account module 210 creates the purchase account for the consumer and relates the purchase account to assets purchased by the consumer.

The debit module 124 debits 408 the purchase account of the consumer by selling a quantity of the asset backing the purchase account balance to the house account and the method 400 ends 410. The quantity of the asset sold to the house account is based on an internal spot price of the asset at the time of the transaction and on an amount of a transaction between the consumer and a merchant. The transaction is based on a credit/debit card purchase by the consumer. The credit card is backed by the balance in the purchase account. The credit/debit card may be issued by the card issue module 208.

Figure 5:
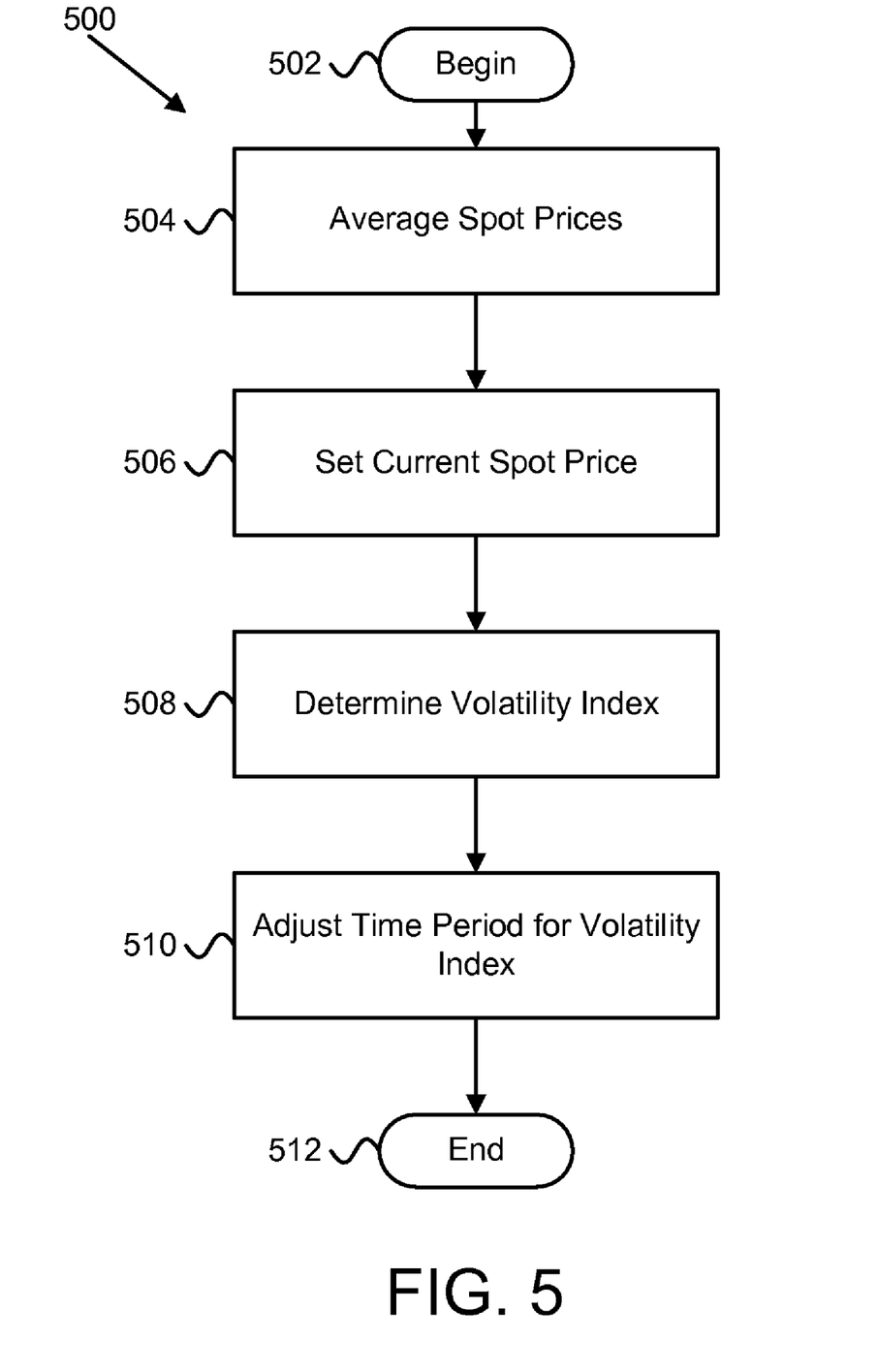
FIG. 5 is a schematic flow chart diagram illustrating one embodiment of a method for backing card-initiated electronic transactions with a continually indexed asset in accordance with the present invention.

FIG. 5 is a schematic flow chart diagram illustrating one embodiment of a method 500 for backing card-initiated electronic transactions with a continually indexed asset in accordance with the present invention. The method 500 begins 502 and the averaging module 302 averages 504 at least two spot prices of an asset. The spot prices are substantially continually available. For example, two spot prices of gold may be averaged.

The price setting module 304 sets 506 an internal spot price for fixed time period. The internal spot price typically is the average of the at least two spot prices. A consumer may purchase or sell a quantity of the asset at the internal spot price during the fixed time period. The volatility index module 306 determines 508 a volatility index of the internal spot price by analyzing a trend based on the internal spot price and at least one previous internal spot price. In an alternate embodiment the volatility index module 306 determines 508 a volatility index by examining trends in spot prices sampled at a rate more frequent than the fixed time period.

The price adjustment module 308 adjusts 510 the fixed time period based on the volatility index of the internal spot price and the method 500 ends 512. In an alternate embodiment the price adjustment module 308 adjusts 510 the internal spot price based on the volatility index.

Figure 6:
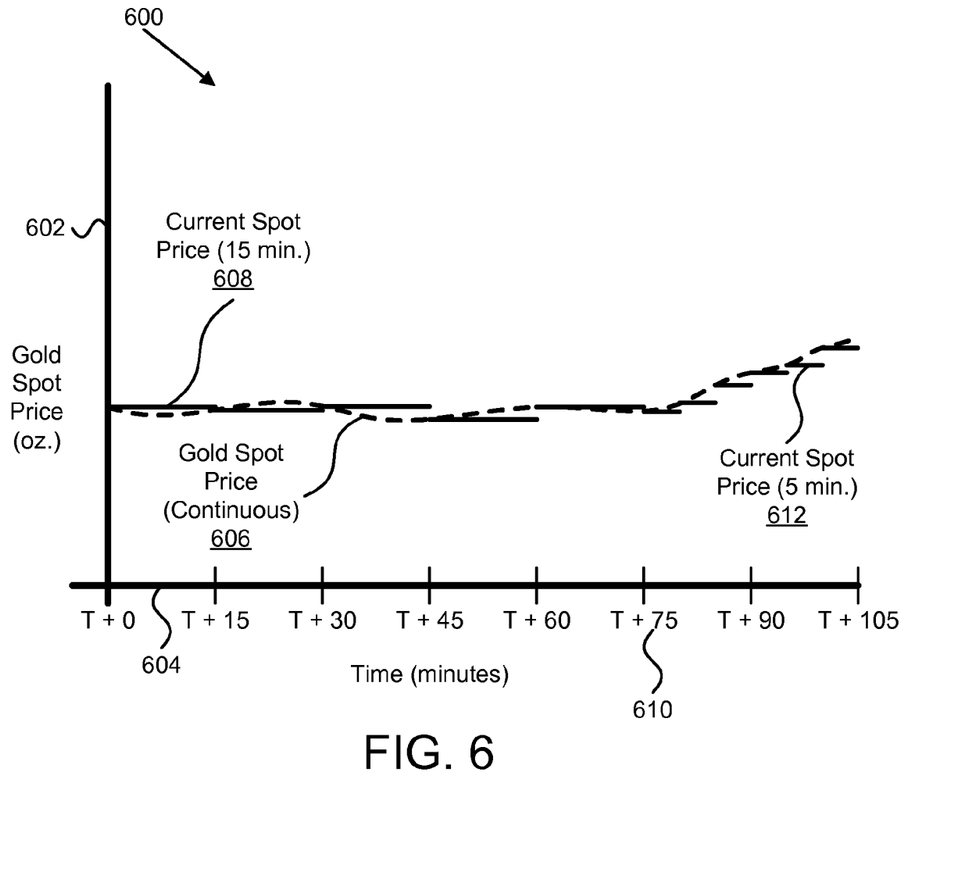
FIG. 6 is a graphical representation illustrating one embodiment of a method for determining a volatility index and fixed time period of an internal spot price of an asset in accordance with the present invention.

FIG. 6 is a graphical representation 600 illustrating one embodiment of a method 500 for determining a volatility index and fixed time period of an internal spot price of an asset in accordance with the present invention. A hypothetical graph 600 of a gold spot price is depicted. The graph 600 includes gold spot prices on the vertical axis 602 and time on the horizontal axis 604. A hypothetical gold spot price curve 606 (dashed lines) is depicted that varies in price over time. The fixed time period is chosen to be 15 minutes, so the time axis displays units of 15 minute increments. At the beginning of the graph 600, the gold spot price curve 606 is relatively flat so every 15 minutes the internal spot price 608 (line segments of 15 minutes) is adjusted.

At around T+75 minutes 610, the gold spot price curve 608 starts to change at a more rapid rate. The volatility index module 306 determines that the internal spot price is more volatile and increases the volatility index. The price adjustment module 308 then reduces the fixed time period of the internal spot price 612 (line segments of 5 minutes) to maintain accuracy of the internal spot price within tolerable limits. In another embodiment, (not shown) the price adjustment module adjusts the internal spot price or adjusts the internal spot price and the fixed time period. For example, the internal spot price may be adjusted upward when the volatility index indicated that the internal spot price is increasing. In addition, the price adjustment module 308 may also decrease the fixed time period.

Beneficially, the present invention provides a credit/debit card backed by an asset such as gold or silver rather than a credit account or bank account on a currency basis. The present invention allows a consumer to purchase a quantity of the asset and then allow the asset to grow as a hedge against inflation. The present invention offers flexibility of a credit/debit card for accessing the assets, which is a feature not provided by other investment schemes, such as 401k accounts or brokerage accounts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to process a transaction for an asset-backed purchase card, the apparatus comprising a computer program storage medium readable by a processor and embodying one or more instructions executable by a processor, the storage medium comprising:

a digital processing apparatus configured to implement operations, the digital processing apparatus configured to implement operations found in a plurality of modules, the plurality of modules comprising:

a house account module that maintains a house account not owned by the consumer, the house account comprising one or more assets that are purchased by the house account, each of the one or more assets having a substantially continually updated spot purchase price;

an asset exchange module that receives funds from a consumer in exchange for a portion of the one or more assets from the house account, wherein a quantity of the assets that are exchanged for the funds is based on an internal spot price of the assets at the time the funds are received and wherein the quantity of the assets that are exchanged increases a balance in a purchase account of the consumer for backing the balance in the purchase account by the assets that are exchanged; and     a debit module that debits the purchase account of the consumer by selling a quantity of the assets to the house account, wherein:

the quantity of the assets sold to the house account is based on the internal spot price of the assets at the time of the transaction and on an amount of the transaction between the consumer and a merchant;

funds other than the assets in the consumer account are transferred to the merchant, the funds corresponding to the amount of the transaction; and         the transaction is based on a purchase card purchase by the consumer wherein the purchase card is backed by the balance in the purchase account.

2. The apparatus of claim 1, wherein the one or more assets comprises one of gold, silver, platinum, palladium, a real estate trust account, stocks, bonds, a market index fund, and a mutual fund, and the digital processing apparatus is configured to implement operations associating the assets to respective internal spot prices.

3. The apparatus of claim 1, further comprising a price setting module that determines the internal spot price for transactions between the house account and a consumer.

4. The apparatus of claim 1, further comprising a merchant request module that:
receives a request for funds from a merchant based on the transaction between the merchant and consumer; and
pays the merchant currency based on the amount of the transaction.

5. The apparatus of claim 1, further comprising a transaction fee module, the transaction fee module configured to retain a portion of a transaction fee.

6. The apparatus of claim 1, wherein the apparatus includes instructions for increasing the internal spot price by the purchase fee, and the amount of the one or more assets exchanged for funds to increase the balance of the consumer's purchase account is based on the internal spot price of the one or more assets increased by a purchase fee.

7. The apparatus of claim 1, wherein the house account module comprises instructions configured to increase a quantity of the one or more assets in the house account in response to the quantity of the one or more assets in the house account dropping below a trigger level.

8. The apparatus of claim 1, further comprising an asset mix module that maintains the relative proportion of two or more assets in the purchase account.

9. The apparatus of claim 8 wherein the relative proportion of the two or more assets is determined by instructions manipulable by one of the consumer and a manager.

10. A program storage device readable by a machine, tangibly embodying a program of instructions executable to perform operations for processing a transaction for an asset-backed purchase card, the operations comprising:
maintaining a house account not owned by the consumer, wherein the house account comprises one or more assets that are purchased by the house account, each of the one or more assets having a substantially continually updated spot purchase price;
determining an internal spot price for the transaction between the house account and a consumer;
receiving funds from the consumer in exchange for a portion of the one or more assets from the house account, wherein a quantity of the assets that are exchanged for the funds is based on the internal spot price of the assets at the time the funds are received and wherein the quantity of the assets that are exchanged increases a balance in a purchase account of the consumer for backing the purchase account by the assets that are exchanged; and
debiting the purchase account of the consumer by selling a quantity of the assets to the house account, wherein:
the quantity of the assets sold to the house account is based on the internal spot price of the assets at the time of the transaction and on an amount of the transaction between the consumer and a merchant;
funds other than the assets in the consumer account are transferred to the merchant, the funds corresponding to the amount of the transaction; and
the transaction is based on a purchase card purchase by the consumer wherein the purchase card is backed by the balance in the purchase account.

11. The computer program product of claim 10, wherein the one or more assets comprises one of gold, silver, platinum, palladium, a real estate trust account, stocks, bonds, a market index fund, and a mutual fund, and the computer program product is configured to implement operations associating the assets to respective internal spot prices.

12. The computer program product of claim 10, wherein determining an internal spot price of an asset comprises:
averaging at least two spot prices of an asset, wherein the spot prices are substantially continually available; and
setting an internal spot price for a fixed time period, wherein a consumer may purchase or sell a quantity of the asset at the internal spot price during the fixed time period and the internal spot price comprises the average of the at least two spot prices.

13. The computer program product of claim 12, further comprising determining a volatility index of the internal spot price by analyzing a trend based on the internal spot price and at least one previous internal spot price.

14. The computer program product of claim 13, further comprising adjusting the fixed time period based on the volatility index of the internal spot price.

15. The computer program product of claim 13, wherein determining the volatility index comprises determining a percent change in the internal spot price with respect to at least one previous internal spot price.

16. The computer program product of claim 13, wherein determining the volatility index comprises determining a slope of a line derived from the internal spot price and at least one previous internal spot price.

17. The computer program product of claim 16, wherein determining a slope further comprises using a curve-fitting function.

18. A system for supporting an asset-backed purchase card comprising:
a purchase card that associates a consumer with a purchase account;
a network that communicates data between elements of the system;
a client transaction server that requests payment of funds over the network, the request in response to a transaction by the consumer using the purchase card;
a server including a plurality of modules and a digital processing apparatus configured to implement operations found in the plurality of modules, the plurality of modules comprising:
a house account module that maintains a house account not owned by the consumer, the house account comprising one or more assets that are purchased by the house account, each of the one or more assets having a substantially continually updated spot purchase price, the one or more assets comprising one of gold, silver, platinum, palladium, a real estate trust account, stocks, bonds, a market index fund, and a mutual fund;
an asset exchange module that receives funds from a consumer in exchange for a portion of the one or more assets from the house account, wherein a quantity of the asset exchanged for the funds is based on an internal spot price of the asset at the time the funds are received and wherein the quantity of the asset purchased by the consumer increases a balance in a purchase account of the consumer; and
a merchant request module that receives the request for payment from the client transaction server over the network;
a debit module that debits the purchase account of the consumer by
selling a quantity of the asset backing the purchase account balance to the house account, wherein the quantity of the asset sold to the house account is based on the internal spot price of the asset at the time of the transaction and on an amount of the transaction between the consumer and a merchant; and transferring funds other than the assets in the consumer account to the merchant, the funds corresponding to the amount of the transaction.

19. The system of claim 18, further comprising a point of sale computer that communicates a transaction for service or merchandise over the network, the transaction conducted using the purchase card.

20. The system of claim 18, wherein the server includes instructions configured to verify adequate assets in the purchase account of the consumer to cover the transaction in response to a request by the client transaction server.

\* \* \* \* \*

UNITED STATES PATENT AND TRADEMARK OFFICE
CERTIFICATE OF CORRECTION

PATENT NO. : 7,752,108 B2
APPLICATION NO. : 11/774413
DATED : July 6, 2010
INVENTOR(S) : Jason W. Pratt et al.

It is certified that error appears in the above-identified patent and that said Letters Patent is hereby corrected as shown below:

Column 16, Lines 29-36
"1. An apparatus to process a transaction for an asset-backed purchase card, the apparatus comprising a computer program storage medium readable by a processor and embodying one or more instructions executable by a processor, the storage medium comprising:
a digital processing apparatus configured to implement operations, the digital processing apparatus configured to implement operations found in a plurality of modules, the plurality of modules comprising:"

---should read,

"1. An apparatus to process a transaction for an asset-backed purchase card, the apparatus comprising:
a digital processing apparatus configured to implement operations, the digital processing apparatus configured to implement operations found in a plurality of modules embodied on a computer program storage medium, the plurality of modules comprising:"

Signed and Sealed this
Twenty-seventh Day of September, 2011

David J. Kappos
*Director of the United States Patent and Trademark Office*